Figure 1:
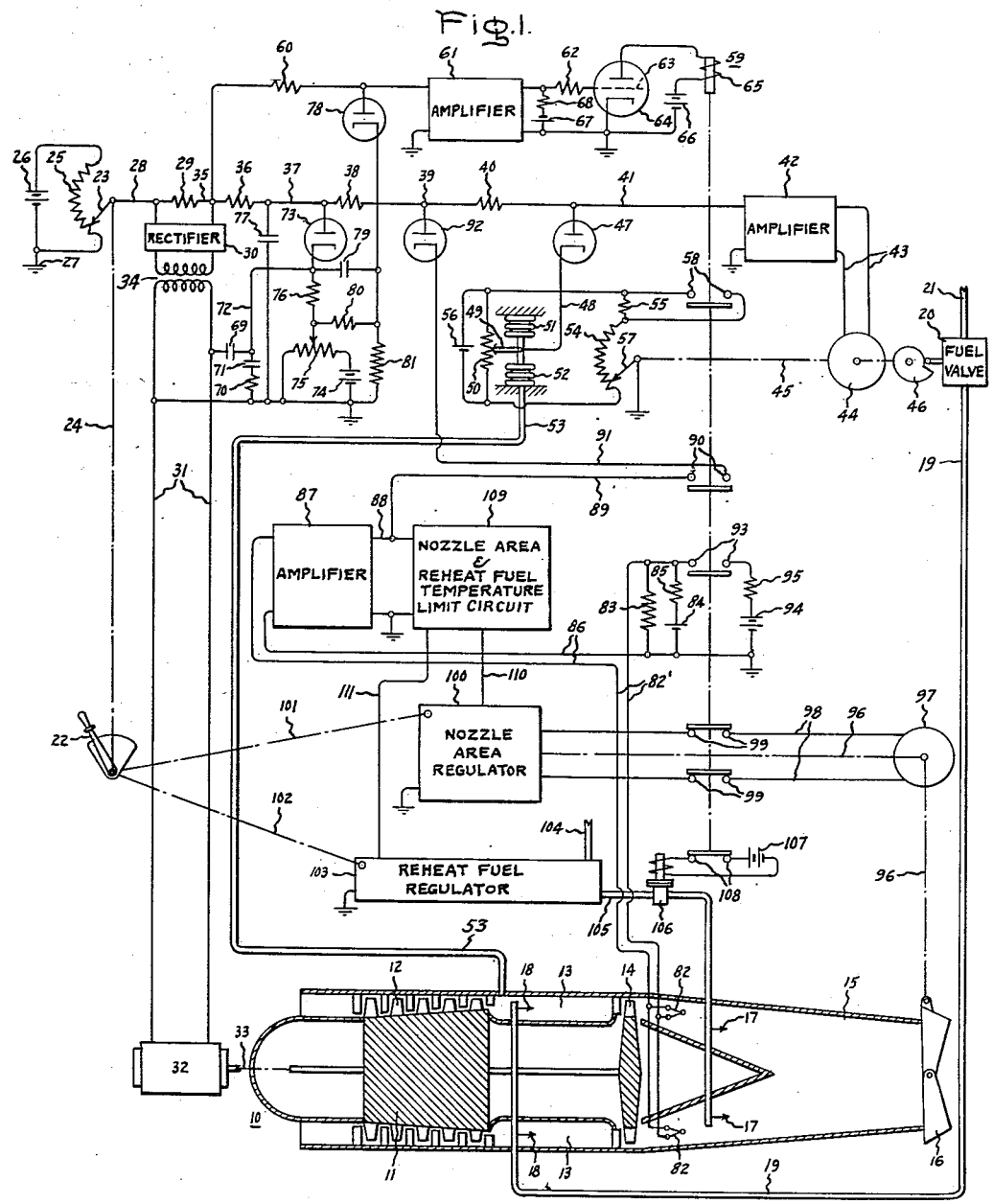

Inventors:
Clinton C. Lawry,
Bruce A. Wells,
by Richard E. Hasley
Their Attorney.

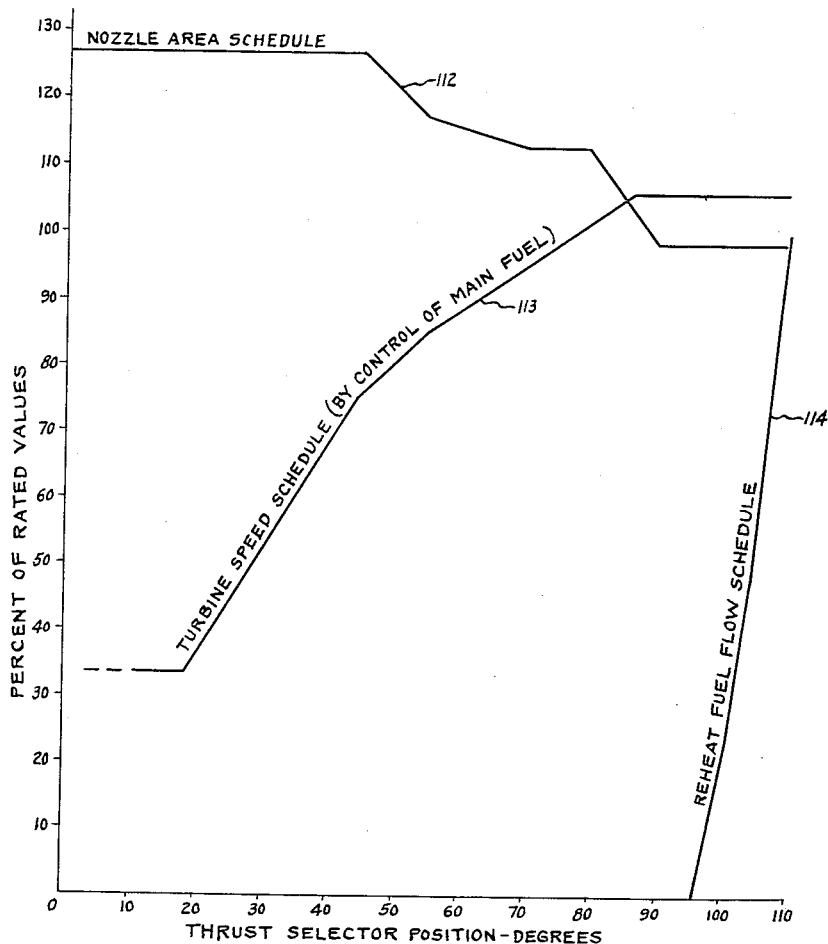

United States Patent Office 2,805,543
Patented Sept. 10, 1957

2,805,543

ENGINE ACCELERATION CONTROL SYSTEM EMPLOYING FUEL FLOW, NOZZLE AREA, AND TEMPERATURE VARIATIONS

Clinton C. Lawry and Bruce A. Wells, Schenectady, N. Y., assignors to General Electric Company, a corporation of New York Application January 31, 1952, Serial No. 269,214

13 Claims. (Cl. 60—35.6)

This invention relates to engine acceleration control systems and more particularly to such systems which are especially adapted for the automatic control of gas turbines, and even more specifically for the control of gas turbines of the type employed as reaction power plants for aircraft.

In the acceleration of an engine such as a gas turbine which is intended for propulsion of an aircraft, such as the type of engine commonly referred to as a "Turbo-jet," a number of problems arise. The maximum power output is not available from the engine until the maximum engine speed is attained, yet under certain operating conditions, such as at take-off of the aircraft, maximum power output is required in as short an engine acceleration time as possible. Since the rotors of aircraft gas turbines are rated for rotation at very high speeds, the dynamic energy storage in the engine rotor, due to the rotor inertia and speed, is very high. Accordingly, a large amount of fuel must be burned over an appreciable period in order to store the needed dynamic energy in the turbine rotor to accelerate the engine up to the maximum rate of speed. From the standpoint of maximum rate of engine acceleration, it is obviously desirable to burn fuel in the engine at the maximum permissible rate. However, it has been found that introduction of fuel at too high a rate in proportion to the pressure of combustion air supplied to the engine combustion chambers from the engine compressor is likely to result in what is called "aerodynamic stall" of the compressor, an undesirable, unstable, engine operating condition. Accordingly, a limit on the maximum flow of engine fuel, which may be referred to below as "maximum fuel limit" may be established by a system which is at least partially responsive to compressor discharge pressure. Since the compressor discharge pressure changes, the limit obviously changes, and for this reason this limit may be referred to below as a "dynamic limit," or a "dynamic upper limit." One system for accomplishing this result is disclosed in our patent application, Serial No. 269,213 filed on January 31, 1952 for a "Control System Having Dynamic Limit Controls" and assigned to the same assignee as the present application. Greater maximum fuel flow may be permitted as the compressor discharge pressure increases. However, it has been found that once the maximum engine speed is achieved, much higher fuel flow rates may be permitted, in relation to the available compressor discharge pressure, without risk of compressor "stall."

Accordingly, it is one object of this invention to provide an accleration control system for an aircraft gas turbine power plant having one range of maximum fuel flow limit control for acceleration, and having a higher range for conditions other than the acceleration condition.

Another problem in the rapid acceleration of such an engine is that the introduction of fuel at too high a rate may result in temperatures high enough to cause engine damage. Accordingly, it is desirable to limit the maximum fuel flow at a maximum engine temperature value which will prevent over-temperature destruction of the engine or engine components. Such a temperature limit of fuel flow for acceleration conditions may permit a substantially higher engine temperature for the relatively brief acceleration period than would be permissible for continuous engine operating conditions. Nevertheless, it is desirable to limit the maximum fuel flow to limit maximum engine temperature during non-acceleration conditions at the lower temperature value permissible on a continuous basis.

Accordingly, it is a further object of this invention to provide an improved control system for an aircraft gas turbine power plant providing for one range of maximum engine temperatures under conditions of acceleration and a lower range of maximum engine temperatures for all other engine conditions.

In an aircraft gas turbine, in order to obtain a wide range of "thrust" or reaction force when the gas turbine is employed as a "turbo jet," and in order to obtain rapid changes in thrust, a variable area turbine discharge or exhaust nozzle may be employed. With such a variable area exhaust nozzle, a control system may be provided in which the engine operator or aircraft pilot may select various combinations of engine speed and exhaust nozzle area automatically with varying desired engine thrusts or power outputs in order to obtain an optimum engine efficiency at all times. Such a control preferably calls for small exhaust nozzle areas at higher thrust settings. If the pilot's control, which may be hereinafter referred to as a thrust selector, is quickly set to a high thrust position, which would ultimately result in a reduction in an exhaust nozzle area, the system would normally attempt to establish all of the conditions called for by the thrust selector setting simultaneously. This would mean that the exhaust nozzle area would be reduced during the period when the engine is being accelerated, as the nozzle may be adjusted much more rapidly than the engine may be accelerated. However, reduction of the exhaust nozzle area during engine acceleration will prolong the period of time required for acceleration because a smaller exhaust nozzle area causes a greater back pressure on the turbine exhaust, which reduces the velocity of gases through the turbine from the combustion chambers for a given combustion chamber pressure. Accordingly, it is desirable to employ some system wherein the nozzle area cannot be reduced during a period when engine speed is being increased. One system for accomplishing this result is shown and described in patent application Serial No. 133,066 now Patent No. 2,706,383 filed December 15, 1949 by John W. Jacobson, for a "Control for Gas Turbine Power Plant" and assigned to the same assignee as the present application. In this aspect, the present invention constitutes, in part, an improvement over the system disclosed in that application.

It is therefore another object of the present invention to provide an improved control system for an aircraft gas turbine for the prevention of closure of the exhaust nozzle area during engine acceleration.

As is well known, some aircraft gas turbines now employ after-burners for the burning of addition fuel in the gas turbine tail pipe "downstream" from the turbine itself. This is sometimes referred to as the burning of reheat fuel. The premature introduction of reheat fuel in the tail pipe when very high thrusts are selected is a problem analogous to the premature closure of the exhaust nozzle during the engine acceleration conditions. The reheat fuel also increases the back pressure on the turbine and would tend to retard the acceleration cycle. Even more important is the fact that proper and efficient reheat fuel burning may be obtained only when the engine is operating at, or near, full speed.

It is therefore a further object of this invention to provide an improved acceleration control system for an aircraft gas turbine in which the initiation of reheat fuel flow is prevented during acceleration conditions.

As outlined in patent application, Serial No. 269,311, filed on January 31, 1952, by Bruce A. Wells for a "Control System for Variable Exhaust Area Reaction Power Plant" and assigned to the same asignee as the present application, it is desirable to control the maximum temperature of an aircraft gas turbine engine by regulation of the exhaust nozzle area and by limiting the amount of reheat fuel during operating conditions approaching the maximum power output range. However, during acceleration, as has been pointed out above, it is desirable to directly limit the fuel supplied to the main combustion chamber "upstream" from the turbine in order to limit the power plant temperature. However, if an attempt is made to limit the main fuel in order to control maximum temperature at the same time that the nozzle area and the reheat fuel are being controlled to limit the maximum temperature, system instability problems may be encountered. Also, it is much more desirable to enlarge the exhaust nozzle area in order to reduce the temperature than to reduce the main fuel flow (except when accelerating), since a given temperature reduction by enlargement of the nozzle area will not reduce the engine power output as much as such a temperature reduction by reduction in the main fuel flow.

Accordingly, it is a further object of this invention to provide an acceleration control system for an aircraft gas turbine power plant having a nozzle area temperature limit in which a main fuel temperature limit is operative only during acceleration conditions.

Other objects and advantages of this invention will be apparent from the following description and the accompanying drawings.

In carrying out the objects of this invention, a system may be provided in which an electrical voltage responsive engine speed governor is employed with a voltage responsive acceleration circuit and switching devices operative upon the detection of a voltage indicating a selected speed of more than a given magnitude above the speed then attained to lower the range of maximum fuel flows permitted, to raise the maximum temperature limit permitted, to disconnect the nozzle area changing and reheat fuel supply systems, and to connect a maximum temperature main fuel limit circuit.

For a better understanding of this invention, reference should be made to the following specification and the accompanying drawings in which Fig. 1 is a schematic diagram of a preferred embodiment of this invention and Fig. 2 is a graphical chart showing desired scheduled characteristics of nozzle area opening, turbine speed, and reheat fuel flows to be selected for various thrust selector positions.

Referring more particularly to Fig. 1 there is schematically shown a gas turbine power plant 10 of the type commonly referred to as a "turbo-jet" including a rotor 11 having a compressor 12, combustion chambers 13, turbine 14, and an exhaust tail pipe 15. A variable area discharge nozzle 16 may be provided at the end of the tail pipe 15. Reheat fuel burners, sometimes referred to as after-burners, may be provided in the tail pipe as indicated at 17. Main fuel burners, as shown at 18, may be supplied with fuel through a fuel line 19 from a main fuel valve 20. Fuel is supplied to the fuel valve 20 through a fuel line 21 from a suitable fuel reservoir (not shown).

The fuel valve 20 may be controlled by a system similar to that disclosed in the above-mentioned patent application Serial No. 269,213. In this system, a thrust selector lever, or power lever 22 sets the position of a potentiometer brush 23 by means of an operating shaft shown at 24 to select a direct current voltage on a potentiometer 25 corresponding to a desired engine speed. The potentiometer 25 is energized with an appropriate voltage from a source such as the battery 26 and one end of the potentiometer is grounded as shown at 27. The potentiometer brush 23 is connected at 28 to a resistor 29 across which there is impressed a speed signal voltage from a rectifier 30 which is energized through a transformer 34 and connections 31 from a tachometer generator 32 which is driven from the engine rotor 11 by a direct connection as shown at 33, or through a suitable gear drive. The direct current voltage impressed across resistance 29 from the output of tachometer generator 32 as rectified by the rectifier 30 is of a polarity to oppose the voltage selected by the setting of the selector potentiometer brush 23 so that when the selected speed is attained, no voltage with respect to ground appears at connection 35 at the output of resistor 29. If a deviation in the magnitude of the voltages from the potentiometer brush 23 and the resistor 29 occurs, the resultant "error voltage" appearing at connection 35 is transmitted through resistor 36, connection 37, resistor 38, connection 39, resistor 40, and connection 41 to an amplifier 42. The amplifier 42 may be of conventional construction and may be connected through output conductors 43 to a positioning motor 44. The positioning motor 44 is connected by means of a shaft schematically shown at 45 to a cam 46 which controls the setting of fuel valve 20 by means of a suitable cam follower. When any speed error signal is received at the input connection 41 of the amplifier 42, a suitable amplifier output is provided through connections 43 to positioning motor 44 in order to obtain an appropriate motor movement to provide a fuel valve adjustment to either raise the amount of fuel supplied to the engine to increase the speed, or to lower the amount of fuel to decrease the speed.

In order to prevent aerodynamic stall of the compressor 12 during heavy fuel flow conditions, a so-called maximum fuel limit circuit may be employed which may limit the maximum fuel flow as a function of compressor discharge pressure. A suitable circuit for accomplishing this purpose is shown as including a diode 47 which is connected to the input 41 of the amplifier 42, and having a cathode connection 48 to a movable potentiometer contact brush 49 of a potentiometer 50. The brush 49 may be actuated by the opposed forces of an evacuated bellows 51 and a pressure responsive bellows 52 which is connected through a pressure line 53 to communicate with the outlet of the engine compressor 12 for response to the compressor discharge pressure. The potentiometer 50 is connected in parallel with a follow-up potentiometer 54 through a series resistor 55 and a direct current voltage is applied across the parallel combination of potentiometer 50 and potentiometer 54 with series resistor 55 from a suitable source such as a battery 56. The brush 57 of potentiometer 54 is mechanically connected to the shaft 45 of the fuel valve positioning motor 44 and electrically connected to ground as shown. This maximum fuel limit circuit forms a portion of the subject matter described and claimed in the above-mentioned patent application, Serial No. 269,213. In that application, it is shown that this system will prevent fuel flows as indicated by the upward movement of follow-up potentiometer brush 57 to a value corresponding to a proportionate rise in the position of compressor discharge pressure indicating potentiometer brush 49. It is explained in that case that when such a condition is exceeded, the cathode connection 48 becomes negative with respect to the anode of the diode 47, causing conduction in diode 47 to reduce the voltage available at connection 35 through the intermediate resistors 36, 38 and 40 so that no positive polarity (fuel increasing) error signal voltage can appear at amplifier input connection 41, and a negative voltage may be produced at connection 41 in order to cause a reduction in fuel flow until an equilibrium condition is reached. As described above, this portion of the system provides a changing or dynamic upper fuel limit.

It has been found that a higher maximum fuel limit than that normally provided by this circuit is permissible upon attainment of substantially full engine speed. Accordingly, normally-open relay contacts 58 are provided to short resistor 55 which is in series with the follow-up potentiometer 54. These contacts 58 are part of a relay 59 which may be referred to hereinafter as an acceleration relay since it is energized under engine acceleration conditions, and de-energized under all other conditions. When acceleration is taking place, therefore, and the contacts 58 are closed to short out the resistor 55, the operation of the maximum fuel limit circuit is in one range in which the maximum allowable opening of the fuel valve, as indicated by the angular elevation of the follow-up potentiometer brush 57, is actually proportionate to the elevation of the compressor discharge pressure indicating potentiometer brush 49. Whenever acceleration conditions do not exist, the relay 59 drops out, opening the contacts 58 and reinserting the resistance 55 in series with potentiometer 54. It will be seen that this circuit action appears to the remainder of the maximum fuel limit circuit as though the follow-up potentiometer brush 57 had been moved downwardly so that greater upward movement of this potentiometer brush is permitted and a higher fuel flow setting is available. Thus, the maximum fuel limit circuit range of operation is raised whenever the acceleration relay 59 drops out.

The energization circuit for the acceleration relay 59 is as follows. A connection is provided by a resistor 60 from the speed error voltage signal connection 35 to an amplifier 61. The output of amplifier 61 is coupled by a resistance 62 to the grid 63 of a grid control electron discharge device 64, the plate circuit of which includes the winding 65 of the acceleration relay 59 and a source of suitable plate supply voltage such as the battery 66. A negative bias may be provided on the grid 63 by means of a suitable source of bias voltage such as a battery 67 which is connected through a series resistor 68 and the coupling resistor 62 to the grid 63. The polarity relationship which is shown is maintained through the amplifier 61 and it will thus be seen that the acceleration relay energizing circuit will be operable in response to a positive direct current error voltage. This is the signal which indicates a speed condition lower than that selected, calling for a rise in fuel flow and an acceleration of the engine. Thus the acceleration relay 59 is picked up whenever an acceleration condition exists. A zero voltage condition or negative voltage condition with respect to ground at the connection 35 will not cause energization of the acceleration relay circuit. In fact, the bias provided by the bias voltage from battery 67 on the grid 63 is preferably chosen at such a value that a positive speed error voltage at connection 35 is required corresponding to a selected speed at least in the order of 2½% of the maximum engine speed above the speed attained in order to cause conduction by the device 64 and sufficient current in the winding of acceleration relay 65 to cause that relay to pick up.

The maximum speed setting of the speed selector potentiometer brush 23 may be made to correspond to the maximum desired speed of the engine, in which case the achievement of maximum speed would result in the reduction of the speed error signal indicated at connection 35 to zero, causing de-energization of the acceleration relay circuit including the amplifier 61 and the electron discharge device 64. However, a tachometer frequency responsive maximum speed limiting circuit may preferably be employed in which the speed selector potentiometer contact 23 sets a voltage corresponding to a speed higher than the maximum rate of speed when maximum speed is demanded, but a circuit responsive to the frequency of tachometer 32 at the maximum speed prevents a speed increase above that maximum. Such a circuit may include a frequency responsive network connected directly to the tachometer output connections 31 and having a series capacitor 69, and a parallel-connected inductance 70. An additional series-connected capacitor 71 may be added in the inductance branch of this filter circuit in order to obtain a more pronounced frequency response characteristic. The output from this frequency responsive filter circuit is applied through a connection 72 to the cathode of a maximum speed limit diode 73. The cathode of diode 73 is biased by a suitable source of positive voltage such as indicated by the battery 74 connected through a resistor network including potentiometer 75 and series resistor 76. When the maximum rate of engine speed is attained, and the filter circuit including the capacitor 69 and inductance 70 permit the passage of a tachometer voltage signal of sufficient amplitude, the negative loops of alternating current voltage at connection 72 counteract the bias provided by battery 74 so that diode 73 becomes conductive. This conduction by speed limiting diode 73 reduces the positive error voltage appearing at connection 35 which would otherwise cause a further increase in engine speed. A capacitor 77 may be provided in the connection across the diode 73 in order to obtain a smoothing action for the voltage at connection 37 where the intermittent, half-wave conduction by diode 73 would otherwise result in a troublesome voltage ripple. This frequency responsive maximum speed limiting system, including the filter having capacitor 69, the inductance 70, the diode 73, and the interconnected components form a portion of the material described and claimed in our patent application Serial No. 264,178 filed on December 29, 1951 for an "Electrical Speed Control System for Engines" and assigned to the same assignee as the present application.

It will be seen that with such a frequency responsive maximum speed limiting system, a direct current error signal voltage of positive polarity will continuously appear at connection 35, which would cause a continuous energization of the acceleration relay 59. Since this is obviously not desired, a diode 78 is connected from the input of acceleration relay amplifier 61 to a capacitor 79 to receive the frequency signal indicative of maximum speed from the connection 72. The diode 78 is also suitably biased with a positive voltage from the bias voltage source 74 through the potentiometer 75 and a separate voltage dividing network including resistors 80 and 81. Conduction by diode 78 will therefore occur, as in diode 73, in response to the signal from the filter circuit to lower the input voltage to amplifier 61 by a drop in resistor 60 to de-energize acceleration relay 59. Since the cathode of diode 73 is held at approximately the voltage appearing at the brush of potentiometer 75, and the cathode of diode 78 is held at a lesser positive voltage as reduced by the voltage drop across resistor 80, diode 78 will become conductive at a lower frequency and a lower engine speed than will diode 73. The acceleration relay circuit therefore will be de-energized at a speed below the maximum engine speed. The bias provided for diode 78 may preferably be chosen so that de-energization of the amplifier 61 and drop out of acceleration relay 59 may be accomplished at a speed approximately 2½% below the maximum speed. The advantage in biasing both diodes 73 and 78 from the same voltage source 74 through a common connection at potentiometer 75 is that an adjustment of potentiometer 75 provides a concurrent bias adjustment for both diodes.

In order to be sure that the maximum safe engine temperature is not exceeded, thermocouples 82 may be provided in the engine tail-pipe 15 immediately downstream from the turbine 14 for detecting the engine temperature. The voltage signal from these thermocouples 82 may be connected by connections 82' in an opposed series relationship with a temperature reference signal voltage which may be supplied across a resistor 83 from a suitable voltage source 84 connected through a resistor 85. The combined voltages from thermocouples 82 and resistor 83 constitute a temperature error signal voltage which may be transmitted by connections 86 to a temperature amplifier 87. The output of the amplifier 87, which appears at a connection 88 is connected by means of a conductor 89, normally open acceleration relay contacts 90, and conductor 91 to a main fuel temperature limit diode 92. This temperature limit circuit may be so designed that when the engine temperature, as indicated by the voltage from thermocouples 82 more than matches the temperature standard voltage across resistor 83, the amplifier 87 is energized to supply a negative voltage at amplifier output connection 88 to reduce the voltage of the cathode of temperature limit diode 92, causing diode 92 to become conductive to thus reduce the speed error signal voltage which would otherwise be transmitted from connection 35 by means of a voltage drop across resistor 38. The above explanation is made with the assumption that normally open acceleration relay contacts 90 are closed. In order to clearly describe the present system, this assumption will be continued, and the purpose of contacts 90 will be explained below. As will appear from the explanation below, in certain modifications of this system, the interruption provided by the acceleration relay contacts 90 will not be required. This temperature limit circuit, including thermocouples 82 and diode 92 and the interconnected apparatus as thus far described (with the exclusion of the relay contacts 90) forms a portion of the material described and claimed in our co-pending patent application, Serial No. 269,213 mentioned above.

For the brief periods during which the engine may be accelerating, it has been found that higher engine temperatures may be permitted than for continuous operation. Since it is imperative that the acceleration of the engine be accomplished in as short a period as possible, it is very desirable to permit such a high transient temperature during acceleration and the higher fuel flows which are thereby possible. Accordingly, the acceleration relay 59 includes normally open contacts 93 which are arranged to connect a voltage from a source such as a battery 94 through a resistor 95 across the temperature standard voltage resistor 83. The source 94 produces a higher voltage than is otherwise provided at resistor 83 by source 84. By means of these connections the standard voltage is raised during acceleration to permit higher engine temperatures and more rapid acceleration. It will be seen from this explanation that a very flexible temperature limit control system is provided in which very rapid acceleration may be permitted at temperatures higher than normal but with a minimum risk of over-temperature damage.

The adjustment of the variable area discharge nozzle 16 may be changed by a shaft schematically shown at 96 which is rotatable by a positioning motor 97. The nozzle positioning motor 97 may be connected for energization through conductors 98, including a double set of normally closed acceleration relay contacts 99 from a nozzle area regulator 100. An extension of the shaft 96 of the positioning motor 97 is shown as connected to the nozzle area regulator 100 in order to provide a nozzle position indication for the regulator. The nozzle regulator 100 may also include a connection for adjustment by the thrust selector 22 schematically shown as the operating shaft 101.

The thrust selector 22 may also include a mechanical connection shown as a shaft 102 to a re-heat fuel regulator 103 for the selection of desired re-heat fuel flow rates. This fuel may be supplied through an intake line 104 from a suitable fuel reservoir (not shown) and regulator 103 to a fuel delivery line 105 to the re-heat burners indicated at 17. A solenoid operated shut-off valve 106 may be connected in the fuel line 105 and may be energized by a circuit including a suitable voltage source 107 and a set of normally closed acceleration relay contacts 108. The valve 106 is therefore open except when the acceleration relay 59 is picked up.

An engine nozzle area and reheat fuel temperature limit circuit 109 may be provided for receiving engine temperature limits signals from the output connection 88 of temperature amplifier 87 and respectively transmitting these signals to the nozzle area regulator 100 and the re-heat fuel regulator 103 through connections 110 and 111. The nozzle area and re-heat fuel temperature limit circuit 109, the nozzle area regulator 100, and the re-heat fuel regulator 103 may be preferably constructed as shown in a co-pending patent application Serial No. 269,311 filed on January 31, 1952 by Bruce A. Wells for a "Control System for Variable Exhaust Area Reaction Power Plant" and assigned to the same assignee as the present application. In the disclosure of that patent application, the nozzle area and re-heat fuel temperature limit circuit is shown to provide temperature limit signals which are effective first to increase the engine nozzle area for the reduction of engine temperature and then to reduce re-heat fuel flow when an increase in nozzle area is no longer possible.

The connections from the thrust selector 22 schematically shown as shafts 24, 101 and 102 to the engine speed selecting potentiometer 25, the nozzle area regulator 101, and re-heat fuel regulator 103 may preferably include some non-linear mechanical or electrical components for providing various desired selected schedules of engine speed, nozzle area opening, and re-heat fuel flow, as the thrust selector is progressively moved from the lowest to the highest thrust positions. Such non-linear characteristics may preferably be provided by employment of individual potentiometers, such as the speed selection potentiometer 25, which have the desired non-linear electrical characteristics. This will be appropriate where the nozzle area regulator 100 and re-heat fuel regulator 103 are also electrical potential regulators such as are disclosed in the above-mentioned patent application Serial No. 269,311.

Fig. 2 shows a preferred set of non-linear engine conditions "selected" or called for by the thrust selector. In this diagram the abscissa is plotted in terms of thrust selector position in degrees, zero degrees being the lowest thrust or "off" position, and 110 degrees being the maximum thrust or full-on position. The desired scheduled values of nozzle area opening, turbine speed, and re-heat fuel flow are respectively plotted as curves 112, 113 and 114 in terms of the percentage of rated values.

As pointed out above, under acceleration conditions, it is imperative that the back pressure on the turbine 14 should not be unnecessarily increased. It is therefore essential that the nozzle area should not be reduced and that re-heat fuel flow should not be initiated during engine acceleration conditions, as these occurrences would each increase the back pressure on the turbine and prevent engine acceleration at the most rapid rate which would otherwise be possible. Accordingly, the normally closed acceleration relay contacts 99 and 108 are respectively provided for disconnection of the nozzle area regulator and motor and for de-energization and closure of re-heat shut-off solenoid valve 106 in order that the nozzle area cannot be reduced and the re-heat fuel flow cannot be initiated during an engine acceleration condition as recognized by the acceleration relay 59. If the highest thrust position with the thrust selector at 110 degrees is suddenly selected, a normal operation of the engine might be as follows: The speed selected by the speed selector potentiometer brush 23 is at the maximum value and the main fuel valve 20 consequently opens up as rapidly as possible to the maximum value permitted by the maximum fuel limit including the diode 47 and the circuit connected thereto, or perhaps, if high temperatures are achieved, the main fuel temperature limit diode 92 and its connected circuit may be operative in limiting the fuel. The acceleration relay 59 will be picked up so that the maximum fuel limit circuit of the diode 47 will be connected for its low range of operation by the acceleration relay contacts 58, the maximum temperature limit diode 92 will be connected in circuit through acceleration relay contacts 90, and the temperature limit reference voltage will be set for the higher temperature value by the acceleration relay contacts 93. Also, the nozzle area and re-heat fuel regulators will be inoperative by the opening of the acceleration relay contacts 99 and 108. When maximum speed is substantially achieved, the acceleration relay cut-off circuit including the diode 78 will be operative to cause the acceleration relay 59 to drop out, raising the maximum fuel limit by the opening of relay contact 58, disconnecting the main fuel temperature limit by the opening of contacts 90, lowering the temperature reference voltage by opening of contacts 93, and reconnecting the nozzle area regulator and opening the re-heat fuel line 105 by closure of contacts 99 and 108. The main fuel flow may then immediately increase because of the raising of the maximum fuel limit, re-heat fuel flow will be initiated because such flow is scheduled to begin (for operation at the maximum thrust position of the thrust selector), and the nozzle area regulator may cause the nozzle to open to some degree if the engine temperature now exceeds the normal steady state temperature value.

The disconnection of the main fuel temperature limit diode 92 by acceleration relay contact 90 is provided because it is desired to control engine temperature by adjustment of either the nozzle area or by operation of the re-heat fuel regulator through the temperature limit circuit 109 under non-acceleration conditions. Such a disconnection of this temperature limit would not be desirable, of course, if the system were to be employed in an engine which was not provided with re-heat fuel burners or a variable area discharge nozzle. The temperature limit on main fuel which is provided by diode 92 is obviously necessary on acceleration, however, since the nozzle area regulator and the re-heat fuel system are disconnected on acceleration by the acceleration relay, as described above. When the nozzle and re-heat temperature limits are in operation, it is not desirable to control the main fuel directly through the circuit including temperature limit diode 92 since concurrent operation of these two temperature limiting systems might cause unstable engine operation. Also, the regulation of engine temperature primarily by the adjustment of nozzle area and then by the limitation of re-heat fuel flow, rather than by direct limitation of main fuel flow during non-acceleration conditions, is desired for the following reasons: The rate of main fuel flow is the essential factor affecting the temperature in the portion of the engine which is most critical from the standpoint of prevention of serious engine damage. The nozzle area adjustment and the re-heat fuel flows affect the flow of main fuel because a closure of the nozzle area or an initiation of re-heat fuel flow cause an increase in turbine back pressure which causes the engine to slow down momentarily, requiring that the engine speed control system should increase the main fuel flow to re-establish the rated speed. Thus, an increase in re-heat fuel flow or a decrease in exhaust nozzle area, by raising the turbine back pressure, causes an increase in main fuel flow to maintain turbine speed with a corresponding increase in engine temperature. Conversely, a decrease in re-heat fuel flow or an increase in the exhaust nozzle area causes an operation of the turbine speed control system in the opposite direction to reduce main fuel flow, thus reducing the engine temperature, and this is essentially the mode of operation of the nozzle area and re-heat fuel temperature limit system. If the temperature were continuously limited by a direct limit on main fuel by the main fuel temperature limit diode 92 and the associated circuit, regardless of nozzle area setting and re-heat fuel flow rates, declines in turbine speed below the rated value would result and, as stated above, it is essential that maximum turbine speed be maintained in order that maximum power output is available. It is therefore essential that speed levels should not be reduced. Further, the burning of main fuel at the main fuel burners 18 produces engine power much more efficiently than the burning of re-heat fuel at the nozzles 17 and it is therefore extremely desirable that the maximum rate of main fuel flow corresponding to maximum speed at maximum engine temperature should be provided whenever thrusts high enough to require re-heat fuel are demanded.

It will be understood that the scheduled values of engine speed, nozzle exhaust area and re-heat fuel flow values provided by the various thrust selector positions as shown in Fig. 2 are not followed progressively for the control operation described above where acceleration from the minimum thrust position to maximum thrust is demanded quickly. Rather, these scheduled values are employed with the configurations shown in order to provide what are considered to be the most efficient and best engine operating conditions for the various engine thrust settings which may be selected by retention of the thrust selector in one of the plotted positions. For instance, at a thrust selector position of 55 degrees no re-heat fuel flow is called for, but an engine speed of about 85% is required, as shown by the curve 113 and an exhaust nozzle area opening of approximately 117% will be called for as shown by curve 112. Although, after acceleration to such an intermediate thrust condition, the acceleration relay contacts 108 are connected to open the re-heat shut-off solenoid valve 106, no re-heat fuel flow will occur since the re-heat fuel schedule curve 114 of Fig. 2 does not call for any such fuel flow. Similarly, although the maximum fuel limit circuit connected to the maximum fuel limit diode 47 is subjected to the raise in calibration provided by the opening of acceleration relay contacts 58 and although a fuel flow corresponding to this raised maximum fuel limit characteristic might result in an aerodynamic compressor stall at the 85% speed value selected, since static engine control conditions have been essentially achieved, no tremendous input of fuel which would approach the main fuel limit value will be required.

The main purpose in raising the main fuel limit characteristic by the operation of acceleration relay contacts 58 is for the purpose of permitting the higher flows of main fuel (which it is known will not cause compressor stall) after the achievement of rated engine speed, which are required to maintain the rated engine speed upon the closure of the exhaust nozzle and the initiation of re-heat fuel flows that increase the turbine back pressures under maximum thrust conditions.

It will be understood that, in an intermediate thrust selector position such as the 55 degree position mentioned above, or perhaps a higher position such as 70 degrees, after the acceleration cycle has been completed, the actual nozzle area may be larger than that shown by the nozzle area schedule curve 112 because of the operation of the temperature limit circuit 109 to hold the engine temperature to a safe maximum value. The nozzle area varying apparatus may be designed so as to provide for nozzle areas larger than any of the scheduled values shown in order to provide for a wide range of nozzle area increase for the purpose of limiting engine temperature.

It will be seen from the above description that the acceleration control system for gas turbines which is provided by this invention is very flexible, accurate, and thorough in permitting engine acceleration at the maximum possible rate while at the same time preventing engine damage or improper engine operation such as "stall" or "blow-out."

While only a single preferred embodiment of this invention has been disclosed above, it will be understood that various changes and modifications will occur to those skilled in the art. The following claims are therefore intended to cover any such changes and modifications which are within the true spirit and scope of this invention.

What we claim as new and desire to secure by Letters Patent of the United States is:

1. In an acceleration control system for a compressor driving gas turbine power plant having a fuel governor for the maintenance of a selected power plant speed by control of a fuel input to the power plant, means responsive to compressor discharge pressure including electrical valve means for variably limiting the maximum flow of fuel for the prevention of compressor stall conditions, and means operative upon the selection of a speed to be maintained by said governor exceeding the existing speed by at least a predetermined amount for lowering the maximum setting of said maximum fuel flow limiting means.

2. An acceleration control system for a compressor driving gas turbine power plant having a fuel governor for the maintenance of a selected power plant speed by control of a fuel input to the power plant, means responsive to compressor discharge pressure for variably limiting the maximum flow of fuel for the prevention of compressor stall conditions, means for limiting the power plant temperature by limiting the flow of fuel and means operable upon the selection of a speed to be maintained by said governor exceeding the existing speed by more than a predetermined value for lowering the maximum setting of said maximum fuel flow limiting means and for raising the setting of said temperature limiting means.

3. A control system for an aircraft gas turbine engine including an integral compressor comprising an electrical system for selecting and maintaining desired engine speeds by balancing a selected speed voltage with a tachometer generator voltage to provide a speed error voltage upon deviation of the engine speed from the selected value, fuel flow regulating apparatus connected for changing the fuel flow rate in response to said speed error voltages, engine compressor discharge pressure responsive electrical apparatus connected through a unidirectionally conductive device to said fuel flow regulating apparatus for modifying the speed error voltage in the fuel decreasing direction in order to limit the maximum rate of fuel flow, an engine temperature responsive electrical apparatus connected by means of a unidirectionally conductive device to said valve adjusting apparatus for modifying the speed error voltage in a fuel decreasing direction upon the attainment of a maximum desired temperature, engine acceleration detection apparatus connected for response to a fuel flow increasing error voltage and including a relay having contacts associated with said pressure responsive apparatus and said temperature responsive apparatus for respectively lowering the maximum fuel flow permitted by said pressure responsive apparatus and raising the maximum temperature permitted by said temperature responsive apparatus.

4. An electrical control system for an aircraft gas turbine having a variable area discharge nozzle comprising an electrical speed governor for controlling the flow of engine fuel to maintain selected speeds and an electrical nozzle area regulator for maintaining selected engine exhaust nozzle areas, said speed control governor including a speed voltage selector device and an engine speed indicating voltage generating device connected in series opposition to provide a speed error voltage having a polarity and magnitude indicative of the direction and magnitude of the deviation of engine speed from the selected value, fuel flow adjusting apparatus connected for operation in response to said error voltage, an acceleration circuit connected for response to said error voltage, said acceleration circuit including a unidirectional conductive device biased for operation in response to speed error voltages of a speed raising polarity and of more than a predetermined magnitude, an acceleration relay connected for energization from said unidirectional conductive device, said relay including contacts connected in circuit with said nozzle area regulator for disablement thereof.

5. An electrical control system for an aircraft gas turbine engine having a variable area discharge nozzle comprising an electrical speed governor for controlling the flow of engine fuel to maintain selected speeds and an electrical nozzle area regulator for maintaining selected engine exhaust nozzle areas, said speed control governor including a speed voltage selector device and an engine speed indicating voltage generating device connected in series opposition to provide a speed error voltage having a polarity and magnitude indicative of the direction and magnitude of the deviation of engine speed from the selected value, fuel flow adjusting apparatus connected for operation in response to said error voltage, an acceleration circuit connected for response to said error voltages, said acceleration circuit including a unidirectional conductive device biased for operation in response to speed error voltages of a speed raising polarity and of more than a predetermined magnitude, an acceleration relay connected for energization from said unidirectional conductive device, said relay including contacts connected in circuit with said nozzle area regulator for disablement thereof, a temperature responsive apparatus connected to said nozzle area regulator for limiting the maximum engine temperature by increasing the exhaust nozzle area, said relay including additional contacts connecting said temperature responsive apparatus through a unidirectionally conductive device to said fuel flow adjusting apparatus for modification of said speed error voltage in a fuel flow decreasing direction upon the attainment of the maximum engine temperature limit.

6. A control system for an aircraft gas turbine reaction engine having a variable area discharge nozzle comprising electrical regulators for maintaining selected values of engine speed and discharge nozzle area, said speed regulator including a variable voltage device for the selection of a voltage corresponding to a desired speed, an engine speed indicating voltage generating device connected in series opposition thereto, said series opposed combination producing a direct current speed error voltage having a polarity and magnitude corresponding to the direction and magnitude of the deviation of engine speed from the desired value, a plurality of series connected impedances connected to said opposed combination for transmitting said speed error voltage, a fuel flow adjusting apparatus connected to receive said error voltage signals from said impedances, an engine temperature responsive maximum temperature limiting electrical apparatus connected to said nozzle area regulator to limit temperature by opening the engine nozzle, and engine acceleration responsive apparatus including a connection to said series opposed combination for actuation in response to error voltages of a speed raising polarity, said acceleration responsive apparatus including a relay having a plurality of switching contacts, a first set of said contacts connecting said temperature limiting apparatus through a unidirectional conductive device to the output connection of a second one of said impedances for limiting engine temperature by limiting fuel flow, a second set of said contacts connected in circuit with said temperature limiting apparatus for raising the maximum engine temperature permitted thereby, and a third set of said contacts connected in circuit for disabling said nozzle area regulator.

7. A control system for an aircraft gas turbine engine having a variable discharge nozzle area comprising an electrical system for selecting and maintaining desired engine speeds by balancing a selected speed voltage with a tachometer generator voltage to provide a speed error voltage upon deviation of the engine speed from the selected value, fuel flow regulating apparatus connected for changing the fuel flow rate in response to said speed error voltages, nozzle area varying apparatus for maintaining selected nozzle areas, engine compressor discharge pressure responsive electrical apparatus connected through a unidirectionally conductive device to said fuel flow regulating apparatus for modifying the speed error voltage in the fuel decreasing direction in order to limit the maximum rate of fuel flow, an engine temperature responsive electrical apparatus connected to said nozzle area varying apparatus for increasing the nozzle area maintained thereby upon the attainment of a maximum desired temperature, engine acceleration detection apparatus connected for response to a fuel flow increasing error voltage and including a relay having a plurality of contacts, first and second sets of said contacts being associated with said pressure responsive apparatus and said temperature responsive apparatus for respectively lowering the maximum fuel flow permitted by said pressure responsive apparatus and raising the maximum temperature permitted by said temperature responsive apparatus, a third set of said contacts arranged for establishing a connection from said temperature responsive apparatus through a unidirectionally conductive device to said fuel flow regulating apparatus for modifying the speed error voltage in a fuel decreasing direction upon the attainment of the maximum desired temperature, and a fourth set of said contacts for disabling said nozzle area varying apparatus.

8. A control system for an aircraft gas turbine engine having reheat fuel burning apparatus for augmentation of thrust comprising an electrical system for selecting and maintaining desired engine speeds by balancing a selected speed voltage with a tachometer generator voltage to provide a speed error voltage upon deviation of the engine speed from the selected value, main fuel flow regulating apparatus connected for changing the fuel flow rate to the main fuel burners in response to said speed error voltage, electrically operated apparatus for the prevention of reheat fuel flow, engine acceleration detection apparatus connected for response to a main fuel flow increasing error voltage and including a relay having contacts associated with said reheat fuel flow prevention apparatus for the operation thereof.

9. A fuel flow control system for a gas turbine power plant having both main and reheat fuel burners for providing a range of selected desired fuel flows including means for imposing a dynamic upper limit on the main fuel flow rate, pressure responsive means for connection to the controlled engine for response to a pressure condition therein connected to said dynamic limit means for varying the fuel flow rates permitted thereby and engine acceleration responsive means connected to said dynamic limit means to raise the dynamic limit characteristic during acceleration, means for throttling the flow of reheat fuel, and a connection from said acceleration means to operate said throttling means for eliminating reheat fuel flow during acceleration.

10. An electrical control system for an aircraft gas turbine engine having a variable area discharge nozzle and reheat fuel burning apparatus including a speed control for the maintenance of selected engine speeds by the control of fuel flow to the main combustion chambers including a variable voltage device for selecting a desired speed in terms of a direct current voltage, a tachometer generator for connection to the engine to be controlled, the output of said tachometer generator being connected in series opposition to said variable voltage device to compare the selected and attained speeds in terms of a comparison of the voltages therefrom to thereby obtain a speed error voltage as the difference therebetween, a first amplifier for amplifying said speed error voltage, a first impedance connected to transmit the error voltage to said first amplifier, a positioning motor connected to the output of said first amplifier, a fuel valve connected for positioning by said positioning motor, an acceleration control including a second amplifier, a second impedance connected to transmit the error voltage to said second amplifier, an output stage connected to said second amplifier and biased for operation in response to speed error voltages beyond a predetermined magnitude and of the engine speed increasing polarity, an acceleration relay connected for actuation by said last-mentioned stage, additional control devices for respectively controlling the variable discharge nozzle area and reheat fuel flow, said relay including contact elements connected in circuit with said additional control devices for disablement thereof to prevent reheat fuel flow and closure of the engine discharge nozzle area during acceleration.

11. A control system for an aircraft gas turbine reaction engine including a compressor for combustion air and having a variable area discharge nozzle and reheat fuel burning for augmentation of thrust comprising electrical regulators for maintaining selected values of engine speed, discharge nozzle area and reheat fuel flows, said speed regulator including a variable voltage device for the selection of a voltage corresponding to a desired speed, an engine speed indicating voltage generating device connected in series opposition thereto, said series opposed combination producing a direct current speed error voltage having a polarity and magnitude corresponding to the direction and magnitude of the deviation of engine speed from the desired value, a plurality of series connected impedances connected to said opposed combination for transmitting said speed error voltage, a fuel flow adjusting apparatus connected to receive said error voltage signals from said impedances, an engine temperature responsive maximum temperature limiting electrical apparatus connected to said nozzle area and reheat fuel regulators, an engine compressor pressure responsive maximum fuel limit electrical apparatus connected by means of a unidirectional conductive device to the output end of one of said impedances for limiting maximum fuel input to prevent compressor stall, an engine acceleration responsive apparatus including a connection to said series opposed combination for actuation in response to error voltages of a speed raising polarity, said acceleration responsive apparatus including a relay having a plurality of switching contacts, a first set of said contacts connected in circuit with said pressure responsive apparatus for raising the maximum fuel flow permitted thereby, a second set of said contacts connecting said temperature limiting apparatus through a unidirectional conductive device to the output connection of a second one of said impedances for limiting engine temperature by limiting fuel flow, a third set of said contacts connected in circuit with said temperature limiting apparatus for raising the maximum engine temperature permitted thereby, and fourth and fifth sets of said contacts respectively connected in circuit for disabling said nozzle area and reheat fuel regulators.

12. An electrical engine control system including a speed control for the maintenance of selected engine speeds by the control of fuel flow including a variable voltage device for selecting a desired speed in terms of a direct current voltage, an alternating current tachometer generator for connection to the engine to be controlled, a rectifier connected to the output of said tachometer generator, the output of said rectifier being connected in series opposition to said variable voltage device to compare the selected and attained speeds in terms of a comparison of the variable voltage device voltage and the rectifier output voltage to thereby obtain a speed error voltage as the difference therebetween, a first amplifier for amplifying said speed error voltage, a first impedance connected to transmit the error voltage to said first amplifier, a positioning motor connected to the output of said first amplifier, a fuel valve connected for positioning by said positioning motor, an acceleration control including a second amplifier, a second impedance connected to transmit the error voltage to said second amplifier, an output stage connected to said second amplifier and biased for operation in response to speed error voltages beyond a predetermined magnitude and of the engine speed increasing polarity, an acceleration relay connected for actuation by said last mentioned stage, a plurality of additional engine control elements, said relay including a plurality of contact elements arranged to shift the connections of said additional control elements from a constant speed operating condition to an engine acceleration operating condition.

13. An electrical engine control system including a speed control for the maintenance of selected engine speeds by the control of fuel flow including a variable voltage device for selecting a desired speed in terms of a direct current voltage, an alternating current tachometer generator for connection to the engine to be controlled, a rectifier connected to the output of said tachometer generator, the output of said rectifier being connected in series opposition to said variable voltage device to compare the selected and attained speeds in terms of a comparison of the variable voltage device voltage and the rectifier output voltage to thereby obtain a speed error voltage as the difference therebetween, a first amplifier for amplifying said speed error voltage, a first impedance connected to transmit the error voltage to said first amplifier, a positioning motor connected to the output of said first amplifier, a fuel valve connected for positioning by said positioning motor, an acceleration control including a second amplifier, a second impedance connected to transmit the error voltage to said second amplifier, an output stage connected to said second amplifier and biased for operation in response to speed error voltages beyond a predetermined magnitude and of the engine speed increasing polarity, an acceleration relay connected for actuation by said last mentioned stage, a plurality of additional engine control elements, said relay including a plurality of contact elements arranged to shift the connections of said additional control elements from a constant speed operating condition to an engine acceleration operating condition, a frequency responsive filter circuit connected to the output of said tachometer generator for response to a generator frequency corresponding to a maximum desired engine speed, separate unidirectional conductive devices connected between said filter circuit and the input connections of each of said amplifiers for providing a voltage of speed lowering polarity for the modification of a speed error voltage of speed raising polarity upon the attainment of the maximum desired engine speed.

References Cited in the file of this patent
UNITED STATES PATENTS

| | | |
|---|---|---|
| 2,432,177 | Sedille | Dec. 9, 1947 |
| 2,606,419 | Rood et al. | Aug. 12, 1952 |
| 2,631,677 | Kochenburger et al. | Mar. 17, 1953 |
| 2,662,372 | Offner | Dec. 15, 1953 |
| 2,667,228 | Wood et al. | Jan. 26, 1954 |
| 2,691,268 | Prentiss | Oct. 12, 1954 |
| 2,697,328 | Lee | Dec. 21, 1954 |
| 2,708,826 | Torell | May 24, 1955 |

FOREIGN PATENTS

| | | |
|---|---|---|
| 626,045 | Great Britain | July 8, 1949 |